(12) United States Patent
Blumenthal

(10) Patent No.: US 11,902,001 B2
(45) Date of Patent: Feb. 13, 2024

(54) SYSTEM AND METHOD FOR SELECTION OF TRANSMIT ARRAY

(71) Applicant: WAFER LLC, Hanover, NH (US)

(72) Inventor: Steven H. Blumenthal, Lexington, MA (US)

(73) Assignee: WAFER LLC, Hanover, NH (US)

( * ) Notice: Subject to any disclaimer, the term of this patent is extended or adjusted under 35 U.S.C. 154(b) by 172 days.

(21) Appl. No.: 17/667,429

(22) Filed: Feb. 8, 2022

(65) Prior Publication Data

US 2022/0271824 A1 Aug. 25, 2022

Related U.S. Application Data

(60) Provisional application No. 63/147,107, filed on Feb. 8, 2021.

(51) Int. Cl.
*H04B 7/08* (2006.01)
*H04B 7/185* (2006.01)

(52) U.S. Cl.
CPC ....... *H04B 7/0834* (2013.01); *H04B 7/18513* (2013.01)

(58) Field of Classification Search
CPC .......... H04B 7/0834; H04B 7/18513
See application file for complete search history.

(56) References Cited

U.S. PATENT DOCUMENTS

| 6,078,286 | A | * | 6/2000 | Gonzales | H04B 7/18513 |
| | | | | | 342/359 |
| 9,337,536 | B1 | * | 5/2016 | Paulsen | H01Q 3/08 |
| 9,647,748 | B1 | * | 5/2017 | Mitchell | H04B 7/18508 |
| 10,506,483 | B1 | * | 12/2019 | Williamson | H04B 7/18584 |
| 2015/0373566 | A1 | * | 12/2015 | Pius | H04W 24/08 |
| | | | | | 370/252 |
| 2020/0227826 | A1 | * | 7/2020 | Washakowski | H01Q 21/22 |
| 2021/0021031 | A1 | | 1/2021 | Wyler | |
| 2021/0288415 | A1 | * | 9/2021 | Bennett | H01Q 3/242 |

* cited by examiner

*Primary Examiner* — Raymond S Dean
(74) *Attorney, Agent, or Firm* — WOMBLE BOND DICKINSON (US) LLP; Joseph Bach, Esq.

(57) ABSTRACT

A system and method for selecting antenna panels for communicating with satellites. The receive panels directed towards a location in the sky where the satellite is expected to be. When the signal from the satellite is received by the panels, parameters of the signals are checked against a threshold. All the panels having the parameters above the threshold are grouped together as a receive group. The parameters of the signals at the receive groups are compared to determine the best receive panel, and the transmit panel associate with the receive panel is selected as the transmit panel.

20 Claims, 13 Drawing Sheets

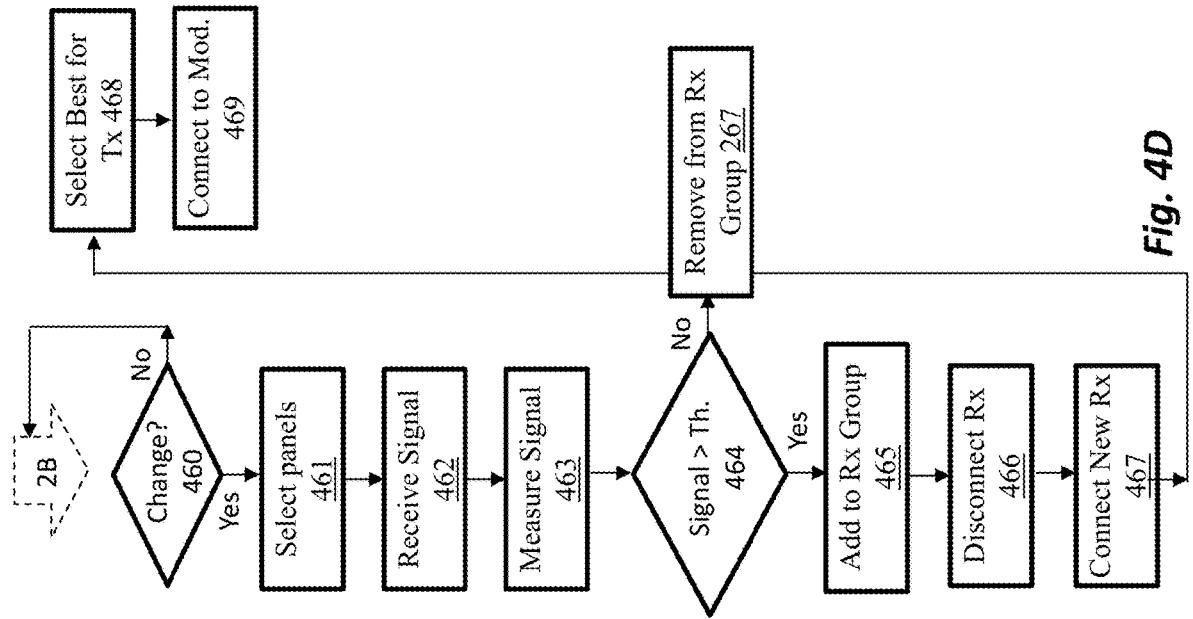
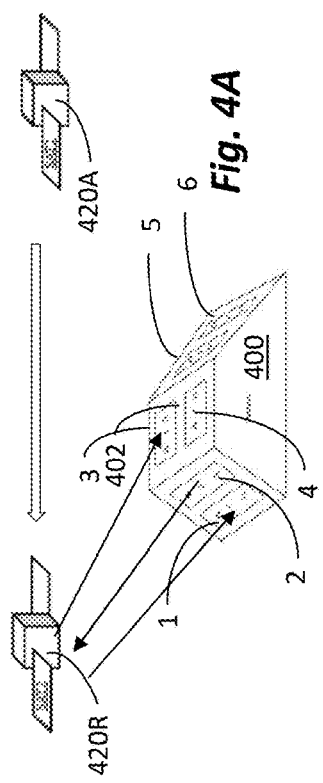
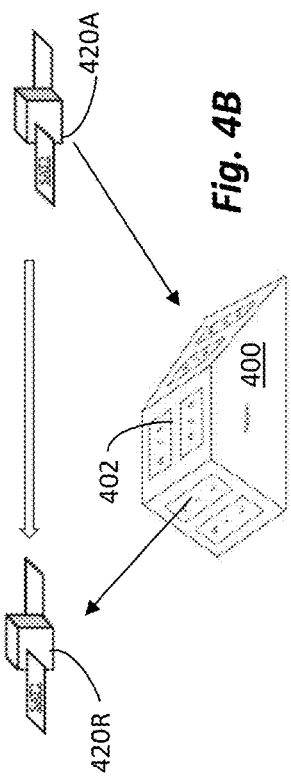
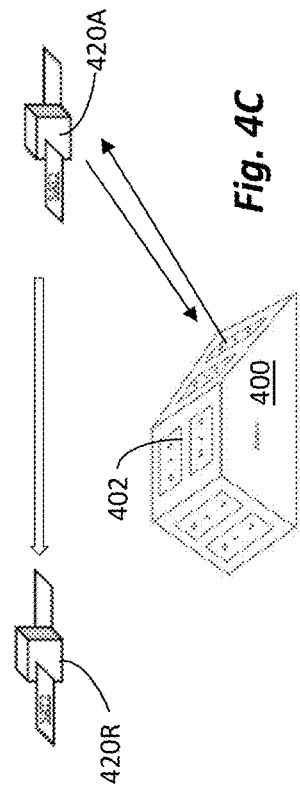

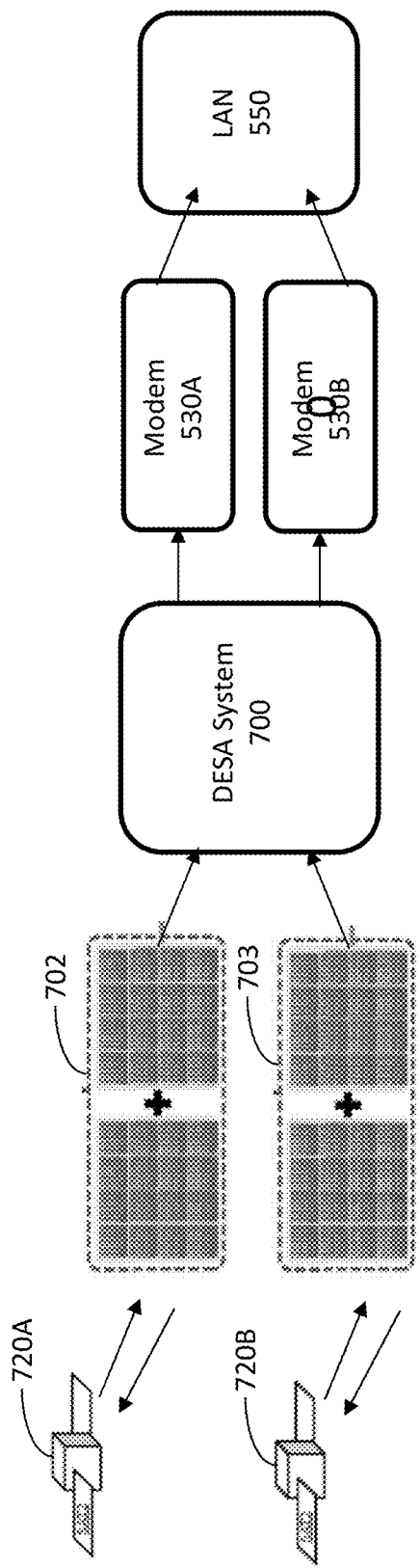
Fig. 7
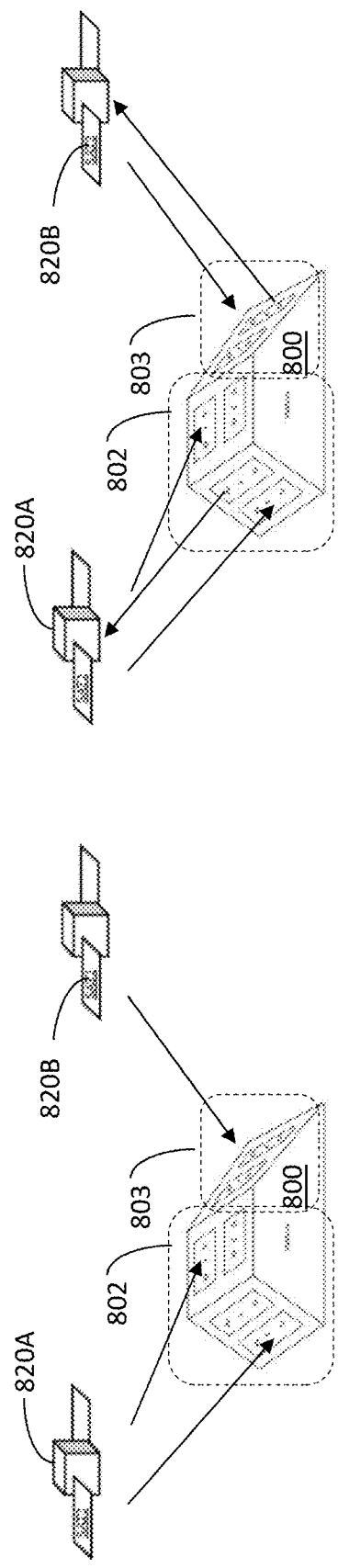
Fig. 8A
Fig. 8B

SYSTEM AND METHOD FOR SELECTION OF TRANSMIT ARRAY

CROSS-REFERENCE TO RELATED APPLICATIONS

This application claims priority from U.S. Provisional Application No. 63/147,107, filed on Feb. 8, 2021, the disclosure of which is incorporated herein by reference in its entirety. The subject matter of this application relates to U.S. application Ser. No. 16/928,126, filed on Jul. 14, 2020, the disclosure of which is incorporated herein by reference in its entirety.

BACKGROUND

1. Field

This disclosure relates generally to the field of wireless communication, e.g., satellite-based communication and microwave point to point communication, and to the control of multiple phased array antennas communicating with multiple antennas.

2. Related Art

The above-cited patent application describes a system and method for real-time multiplexing phased array antennas to modems. Specifically, the application relates to methods for receive diversity combining, i.e., combining satellite transmission signals received at a plurality of antennas. It describes locating a distributed set of several electronically steerable array (ESA) antenna panels on various surfaces of a platform (a building or fixed structure, a land, air or sea vessel, etc.) such that at any time some subset of the ESA antenna panels have a steerable view toward a particular satellite or set of satellites. This is referred to as a Distributed ESA or DESA system in this disclosure. The group of all ESA antenna panels on the platform can form an aggregated single aperture (a single aggregated ground terminal) or multiple apertures (multiple ground terminals) used for communications over a single satellite or multiple satellites.

The disclosed receive diversity combining method selects the subset of ESA antenna receive panels with the best unblocked angles toward the satellite and the highest received signal strength and the best signal-to-noise ratio (SNR) to use in its receive combining algorithm. The DESA system antenna aggregation and control system has access to information about the geometry of the platform and the physical relationship of the ESA antenna panels relative to each other and to the platform. It also has access to real-time updated information that describes the platform's position and orientation in space. The DESA system also has access to real-time updated information about the ephemeris data (location in space) of the satellites that it is set up to use and communicate over. The DESA system uses this static and dynamic updated real-time platform and satellite position and orientation information to determine which ESA antenna panels have the best "look angle" to a particular satellite that is of interest. The best "look angle" is defined as the ESA antenna receive panels with their receive beams steered to the satellite of interest at that instant and having an angle closest to boresight, where boresight is the direction that is perpendicular to the plane of the ESA antenna and the direction of highest gain for the antenna panel. In addition, the DESA system factors in any potential platform or nearby environmental blockage that is known between that ESA antenna panel and the chosen satellite. The remaining ESA antenna receive panels that do not have good look angle toward the satellite at any instant and therefore will not have a high received signal strength or SNR with that satellite may or may not be used in the receive panel combining depending on whether or not they contribute to improvement in the overall SNR when combined using the diversity combining algorithm described in the previous application. The DESA system utilizes both antenna aperture combining and switching (selection) to utilize the optimum combination of antenna panels for communications over a satellite or set of multiple satellites at any given instant of time.

In the case where an individual ESA antenna receive panel is not large enough or does not have high enough Gain/Noise Temperature (G/T—a figure of merit in the characterization of antenna performance, where G is the antenna gain in decibels at the receive frequency, and T is the equivalent noise temperature of the receiving system in degrees Kelvin) to meet the minimum G/T required by particular satellite operator, diversity combining of the ESA antenna receive panels can create a larger effective antenna aperture and improve the G/T of the aggregate antenna G/T of the combined receive aperture.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

This disclosure provides system and method for selection of transmit array for the multiple distributed ESA antenna receive panels. This disclosure is particularly beneficial for the case where a set of distributed ESA antenna panels are used to communicate with a single Geostationary Earth Orbit (GEO) satellite or a single type of Non-Geostationary Earth Orbit (NGSO) satellite constellation. An NGSO satellite constellation consists of multiple instantiations of the same or similar satellites in a non-geostationary orbit with the satellites moving with respect to a fixed point on the Earth and therefore require a handover from one moving satellite to the next in the orbital chain to maintain continuous communications. In addition, this disclosure is also beneficial for the case where multiple distributed ESA antenna panels are divided up into groups and used with either several (two or more) geostationary or several moving satellites that are part of a constellation or both geostationary satellites and non-geostationary satellites that are part of a constellation.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

One or more embodiments of the present invention are illustrated by way of example and not limitation in the figures of the accompanying drawings, in which like references indicate similar elements and in which:

FIG. 2 illustrates an arrangement for communication between a platform and a satellite, according to an embodiment, while

FIGS. 4A-4C illustrate a DESA system performing a Break-Before-Make handover, according to an embodiment.

FIG. 4D illustrates a flow chart for a process of Break-Before-Make handover involving a DESA system, according to an embodiment.

FIG. 7 shows four ESA antenna panels on a platform split into two groups of two ESA antenna panels each, according to an embodiment.

FIGS. 8A and 8B illustrate an embodiment of a DESA system dividing its panels into two groups for communication with two satellites.

DETAILED DESCRIPTION

Embodiments of the inventive real-time multiplexing antennas and control will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Incidentally, references made herein to a satellite, a platform, or a terminal are interchangeable and are only for illustration purposes. The physical locations may be swapped such that the steerable beam and its effects may originate on the satellite, the platform, terminal or all. The same is true for the receiving and transmitting—either side may be the receiving or the transmitting side and the use of the words either receiver or transmitter are for illustration only and not meant to limit the inverse or even simultaneous receive and transmit.

In many types of RF antennas, reception and transmission are symmetrically reciprocal such that a description of one equally applies to the other. In this description it may be easier to explain transmission, but reception would be the same, just in the opposite direction. Also, in the disclosed embodiments it is assumed that the disclosed antenna is mounted or integrated onto a platform, and its main beam is aimed at another antenna, herein sometimes referred to as the target. The antenna of the target is also mounted or integrated onto a platform, and either or both platforms may be moving. For example, the antenna may be mounted on a vehicle, such as an airplane, a ship, an automobile, etc., and the target may be mounted on, e.g., a satellite. The symmetry concept applies here as well, as the antenna may be the one that is mounted on the satellite, while the target may be mounted on a vehicle.

Also, in some embodiments one electronically steerable antenna is used for both transmission and reception. Conversely, in other embodiments a pair of electronically steerable antenna is used, one transmission and one for reception. The construction of each antenna of the pair may be identical, but one is coupled to a transmitter, while the other is coupled to a receiver.

Figure 1:
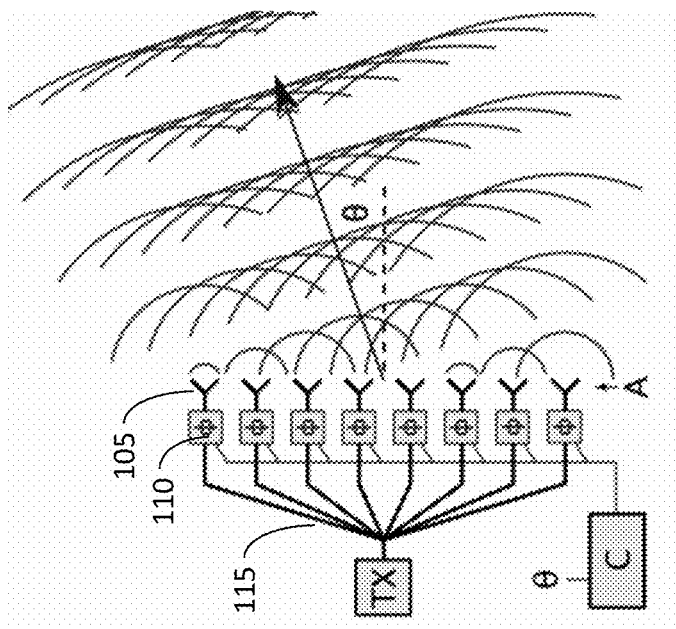
FIG. 1 illustrates a phased array antenna, also referred to as electronically steerable or scanned array, which may be used in any of the embodiments disclosed herein.

FIG. 1 illustrates a phased array antenna, also referred to as electronically steerable or scanned array, one or multiple of which may be used in any of the embodiments disclosed herein. A phased array refers to an array of radiators forming a main beam, wherein the direction of the main beam is electronically steerable by changing the phase/time delay of the RF energy arriving at each of the radiators. For simplicity, the illustration shows a linear array, but for the disclosed embodiments it is more beneficial to utilize a two-dimensional array, such that the beam can be steered in two dimensions. The array comprises radiating elements 105, each connected to a phase shifter 110. Each of the phase shifters 110 may be in the form of an electronically controlled delay line. The phase shifters 110 are controlled by a computer C to introduce a certain amount of delay in the corresponding transmission lines and thereby steer the beam from boresight by an angle $\Theta$.

The transmitter TX generates the signal, which is applied to a corporate feed 115, which splits the signal to be delivered to each of the radiating elements 105. Prior to reaching the radiating element, the signal from the feed passes through the corresponding phase shifter 110 such that the phase of the signal in each delay line is changed by an individual amount to cause the beam to steer. The phase shifters 110 can also be controlled by an on-chip processor or baseband processor. The range of each phase shifter can be quantized into a look-up table (LUT). The beam can be steered by quickly retrieving a phase value from the memory. The reverse happens for reception.

The example illustrated in FIG. 1 is a passive phased array or passive electronically scanned array (PESA), which is a phased array in which the antenna elements are connected to a single transmitter and/or receiver. However, the disclosed embodiments are not limited to PESA, but rather encompass any electronically steerable antenna. For example, an active phased array or active electronically scanned array (AESA)

may also be used. AESA is a phased array in which each antenna element has an analog transmitter/receiver (T/R) module which creates the phase shifting required to electronically steer the antenna beam. Any of the disclosed embodiments may also be implemented using a digital beam forming (DBF) phased array, which has a digital receiver/exciter at each element in the array. The signal at each element is digitized by the receiver/exciter, so that antenna beams can be formed digitally in a field programmable gate array (FPGA) or the array computer 110. This approach allows for multiple simultaneous antenna beams to be formed, e.g., by grouping the radiating elements into subgroups.

Single Satellite or Single Satellite Constellation Operation

Figure 2:
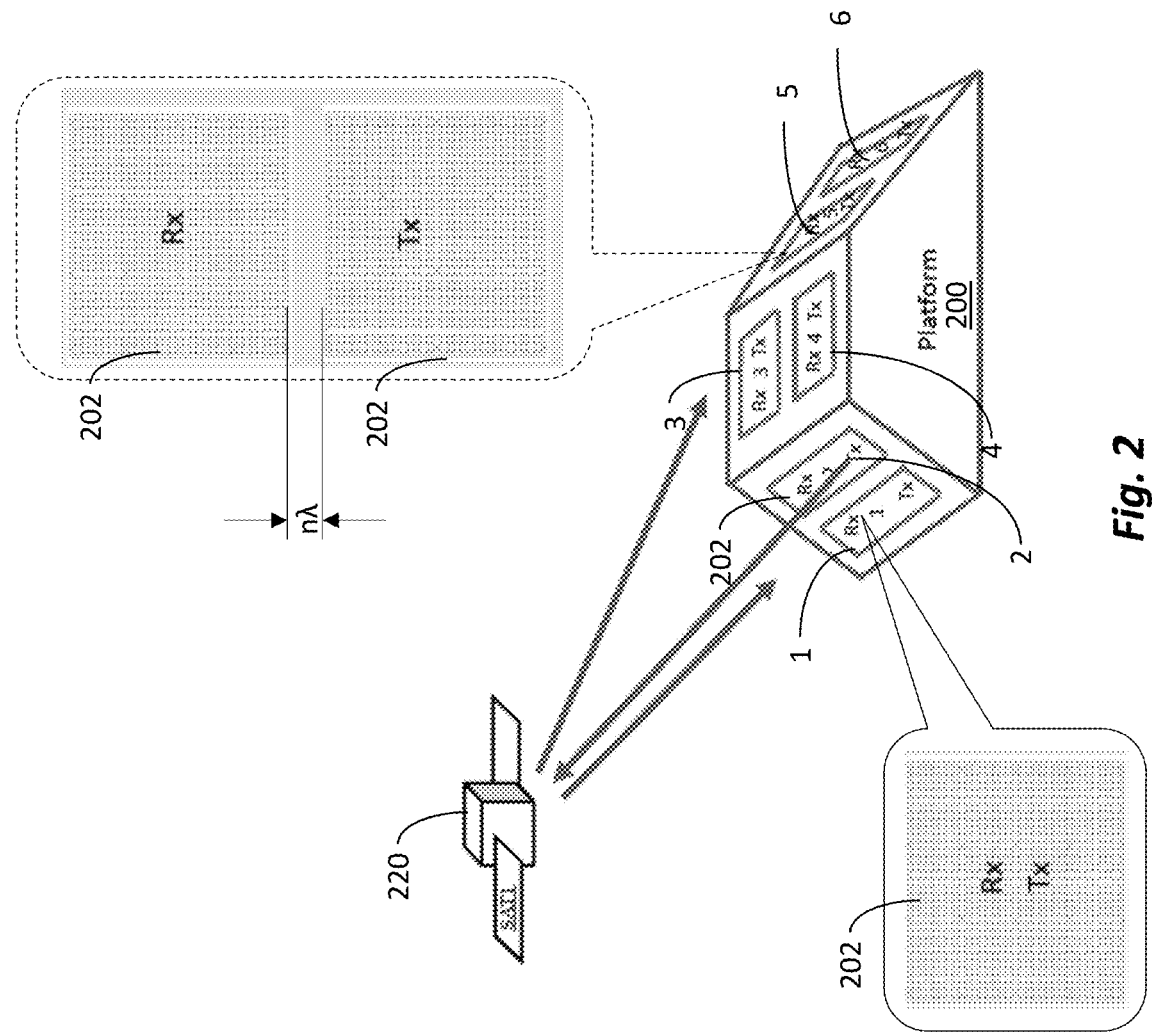

FIG. 2 illustrates an arrangement for communication between platform 200 and satellite 220, according to an embodiment. In the Figures, Rx represents the ESA antenna's receive function for signals coming from a satellite in space to the ground terminals and Tx represents the ESA antenna's transmit function for signals going from the ground terminal up to a satellite in space. Embodiments described in this disclosure have an ESA antenna transmit panel associated with each ESA antenna receive panel. In order to be associated with a receive panel, a transmit function can be incorporated into the receive panel and may share the same radiating elements, as illustrated in the solid-line callout of FIG. 2. In this case the antenna panel is considered to be a single aperture. Alternatively, to be associated with an ESA antenna receive panel, the transmit panel can be next to the receive panel in the same plane as the receive panel and located a small number of receive or transmit carrier wavelengths (nλ, wherein n is an integer smaller than 10) away from the receive panel, as illustrated in the dash-line callout of FIG. 2. In many cases a single ESA transmitter (either incorporated into a single antenna panel, i.e., a single aperture, or as a separate transmit panel adjacent to the receive panel) will have sufficient Effective Isotropic Radiated Power (EIRP) to meet the minimum EIRP requirements for particular satellite operators, even when the ESA transmit antenna panel is not aligned perfectly with the satellite, such as at boresight. This disclosure describes the system and method to select one of the ESA antenna transmit panels to use for transmission to the satellite and the method to select which particular ESA transmit antenna panel to be the transmitter at any given instant.

FIG. 2 illustrates incident radiation from a single satellite 220 on the multiple ESA antenna receive panels in various locations on the platform 200. The system of platform 200 selects the set of ESA antenna receive panels to be use in the diversity combining at any given instant. In the particular instant illustrated, the ESA antenna receive panels 1-4 are illuminated by incident radiation from the satellite 220, while the ESA antenna receive panels 5 and 6 are shadowed from the incident radiation due to the particular orientation at the instant illustrated. Consequently, the received signals from ESA antenna receive panels 1-4 are diversity combined to yield a higher receive signal strength and higher SNR.

Conversely, at any given time the SNR of the receive signal of the panels that participate in the diversity combination is compared to each other determine the panel with the highest SNR. The ESA antenna receive panel with the highest SNR is selected to be used as the transmit antenna and the transmit signals from the platform modem's modulator are routed to that transmit antenna panel. When multiple ESA antenna receive panels have the same maximum receive signal strength or SNR, then any one transmit panel of that set can be chosen as the transmit panel at that instant. In the particular example illustrated in FIG. 2, ESA antenna transmit panel 2 is selected as the transmit panel. All other ESA antenna transmit panels are off and not transmitting. Since the transmit panels may consume more power than receive panels, this can result in a significant saving of ESA antenna system power. Such an arrangement may be referred to as diversity combining receive with single transmit.

As the platform 200 or the satellite 220 move, the angle from each ESA antenna receive panel 202 to the satellite 220 may change. This may change the received signal strength and receive SNR, along with the ESA antenna receive panels' G/T for those of the ESA antenna receive panels that continue to maintain good look angles and connectivity to the satellite. This may also change the composition of the set of receive panels that are diversity combined into the received signal and sent to the modem. FIG. 2A illustrates the arrangement of FIG. 2 at a different moment in time, wherein all of the ESA antenna receive panels are in line of sight of the satellite 220, and therefore are able to receive the signal from the satellite. In this orientation, the receive signal of ESA antenna receive panels 1-6 are combined to generate the receive signal that is sent to the platform 200 modem's demodulator. Therefore, the DESA system may then change the transmit panel that is being used at that instant. FIG. 2A shows that at that instant ESA transmit antenna panel 3 is selected for the transmit function. The speed at which either the platform and satellite are moving determine the update rate at which ESA antenna receive panel SNR must be measured and the change in the selection of the transmit panel is to be made.

Figure 2B:
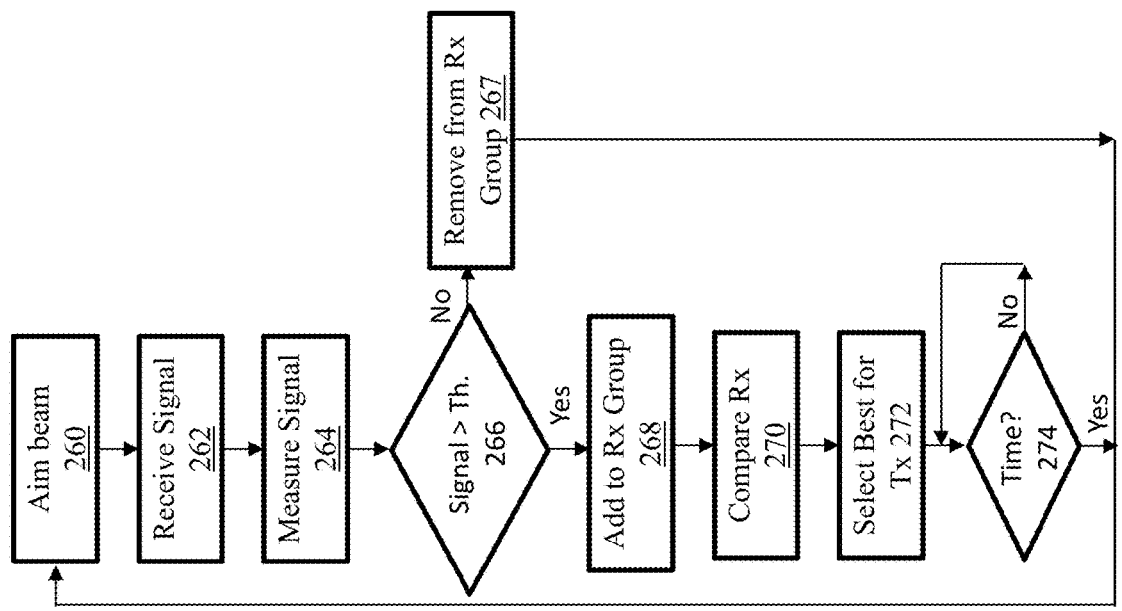
FIG. 2B illustrates a flow chart for a process of operating a plurality of ESA antenna receive panels for reception and transmission over one satellite, according to an embodiment.
Figure 2A:
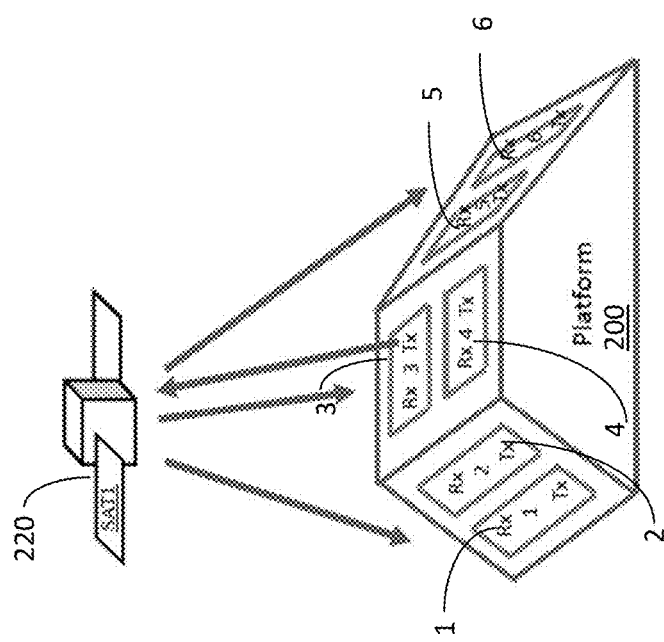
FIG. 2A illustrates the arrangement of FIG. 2 at a different moment in time.

FIG. 2B illustrates a flow chart for a process of operating a plurality of ESA antenna receive panels for reception and transmission over one satellite. In step 260 the controller, e.g., computer C of FIG. 1, uses the information it has regarding the location of the satellite, e.g., the ephemeris data for the satellite, to provide the proper signals to all of the phase shifters of all of the panels to direct their beam towards the satellite. At 262 a receive, Rx, signal is received by any of the panels that is able to receive the signal, and at 264 the parameters of the Rx signal received at each panel is measured. The parameter may include any of signal strength, SNR, and or G/T. At 266 the Rx parameter(s) for each panel is compared to a threshold and when the threshold is passed, at 28 that panel is assigned to the Rx group. Otherwise, at 267 that panel is removed from the Rx group. At step 270 the parameter(s) of the panels belonging to the Rx group is/are compared among each other, and in 272 the Rx panel with the best parameter(s) is selected as a transmission (Tx) panel. At 274 it is checked whether preset time period has passed and, when it does the process is repeated.

Use of DESA System for Non-Geostationary Orbit (NGSO) Satellite Constellation Break-Before-Make Handover In this section, the case of communications over a single satellite within a non-geostationary satellite constellation is disclosed. Of particular concern is the method for the handover of communications from a receding satellite as it moves away from the ground terminal and passes out of view, to the approaching satellite in the constellation, as it moves into view of the ground terminal. Two different methods of handing off from the receding satellite to the approaching satellite are discussed; Break-Before-Make handover and Make-Before-Break handover.

The simplest case of Break-Before-Make handover involves a single ESA antenna with receive and transmit functions, along with a single modem (modulator/demodulator). During normal, non-handover operation, the single ESA antenna may be in full duplex (transmit and receive) communications over one of the satellites in an NGSO satellite constellation, referred to as the current satellite. As this current satellite moves in its orbit it will move out of view relative to the ground terminal. This satellite will become the receding satellite at the time of satellite-to-satellite handover. A handover from the current satellite to another satellite in the constellation will occur when the current satellite has moved further away from the ground terminal and another satellite in the constellation has moved closer to the ground terminal.

Figure 3:
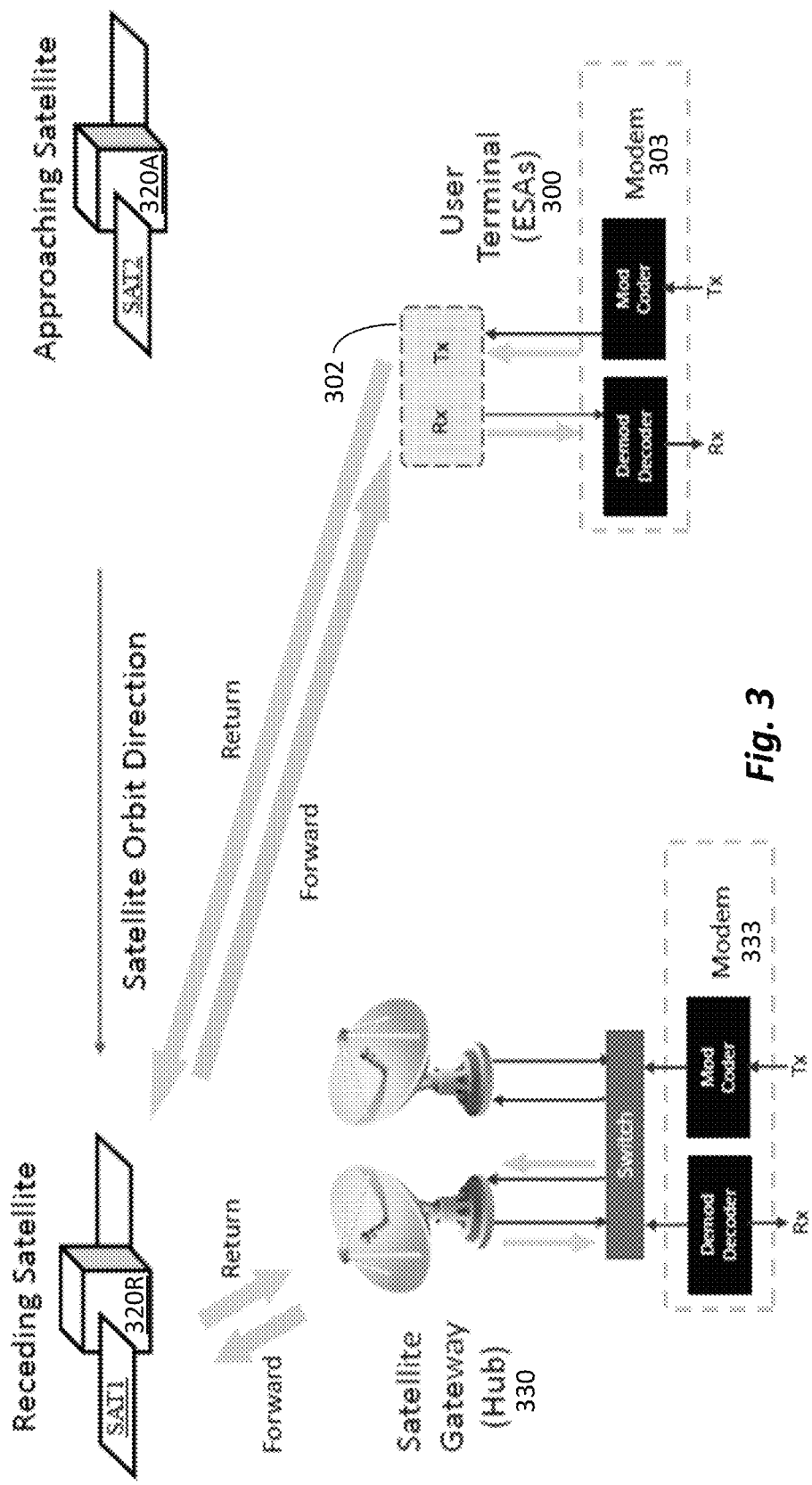
FIGS. 3 and 3A illustrate a process of Break-Before-Make handover involving a single ESA antenna with receive and transmit functions, according to an embodiment.

FIG. 3 illustrates a moment in time wherein a user terminal, i.e., a base station, 300 communicates with receding satellite 320R, and an approaching satellite 320A comes into view. FIG. 3 illustrates the full duplex communications over the receding satellite 320R. A handover time interval is chosen by the NGSO satellite constellation operator based on the relative position of the ground terminal on a platform to the position in space of the receding and approaching satellites in the constellation. Satellite ephemeris data for the approaching satellite is used to repoint the ESA receive beam from the receding satellite 320R to the approximate location of the approaching satellite 320A. A pointing and signal acquisition algorithm based on maximizing the receive signal strength is then used by the user terminal 300 to lock the receive beam onto the approaching satellite 320A. Once the receive beam has been found and locked onto the approaching satellite 320A, the ground terminal's modem's demodulator will lock onto signal coming from the approaching satellite and report its SNR. If link conditions change, the modems at each end of the link may adjust the modulation and coding to be different from what was used to communicate with the receding satellite 320R.

Once the receive antenna's beam has been repointed and the modem demodulator has locked onto the signal from the approaching satellite, the transmit antenna is muted and the transmit beam is repointed to the approaching satellite using the receive antenna panel's beam pointing as its guide. Once the transmit beam has been repointed to the approaching satellite, the transmit antenna will be unmuted and full duplex communications will resume over the approaching satellite. Once full duplex communications over the approaching satellite has been confirmed by the gateway 330, the gateway 330 will turn off its transmitter to the receding satellite 320R, as shown in FIG. 3A. During the time that it takes the ESA antenna 302 to repoint its beam and for the modem 330 to reacquire the receive signal from the satellite 320A and start up its transmitter, communications will be interrupted. As the approaching satellite moves across the sky, it will eventually become the receding satellite and a new approaching satellite (the next satellite in the orbital chain) will appear to the user terminal and the handover process will repeat.

Figure 3B:
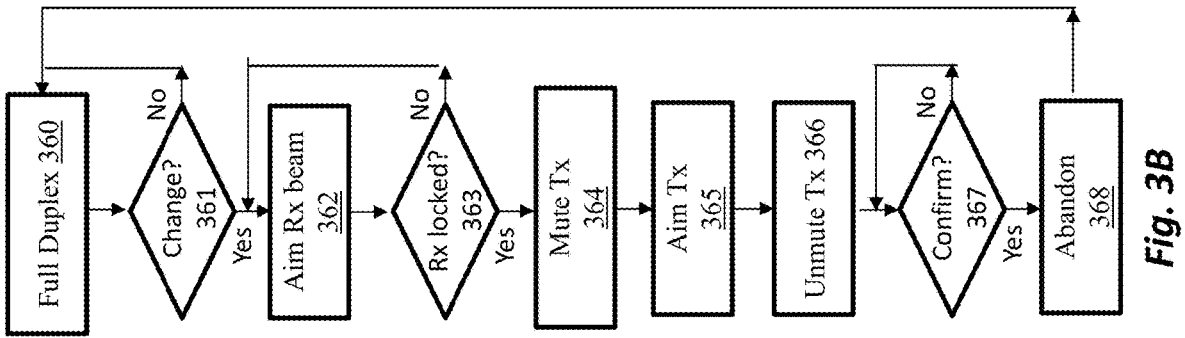
FIG. 3B illustrates a flow chart for a process of Break-Before-Make handover involving a single ESA antenna with receive and transmit functions, according to an embodiment.
Figure 3A:
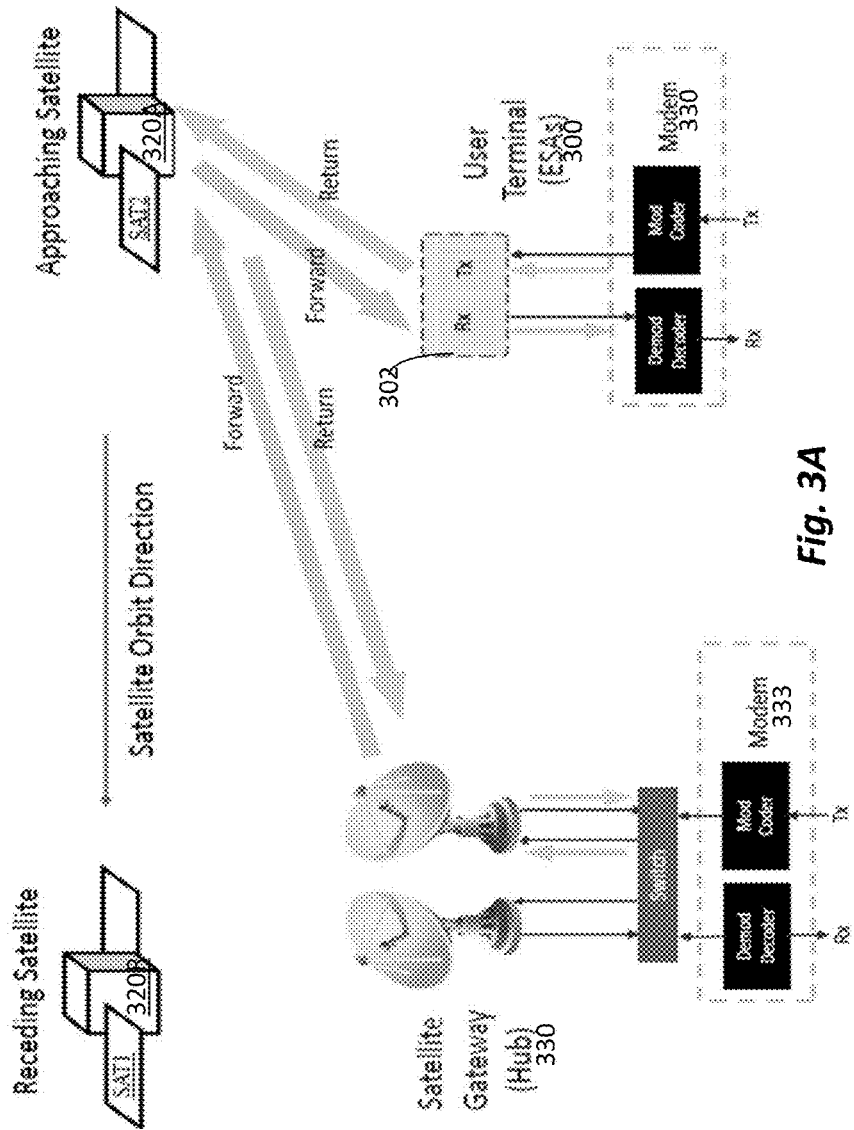

FIG. 3B illustrates a flow chart for a process of Break-Before-Make handover involves a single ESA antenna with receive and transmit functions, according to an embodiment. At 360 the user terminal performs full duplex communication with the current satellite. When at 361 it is determined that communication should be changed to an approaching satellite, the process proceeds to step 362, wherein the user terminal aims its receiving beam Rx towards the ephemeris location of the approaching satellite. At 363 it is checked whether the modem has locked on the Rx signal, and when lock is achieved the process proceeds to step 364 wherein the transmission Tx over the current satellite is muted. At 365 the Tx panel is redirected towards the approaching satellite and 366 the Tx panel is unmuted. When at 367 full duplex communications over the approaching satellite has been confirmed, at 368 communication over the receding satellite is abandoned.

In the case of Break-Before-Make handover with a DESA system, a set of antenna panels— which may be a subset of the total available panels—that have good look angles and high received signal strength and the highest SNR is used for communications over the current satellite. The exact set of panels in use may change over time while the current satellite is being used due to the motion of the platform or the motion of the satellite. FIGS. 4A-4C show the sequence of events for Break-Before-Make handover with a set of ESA antenna panels forming a DESA system. FIG. 4A shows the set of ESA antenna panels 402 on platform 400 that are being used to communicate over the receding satellite 420R. In this instance, ESA antenna receive panels 1-4 are being used, and one of the ESA antenna transmit panels (in this case the ESA antenna panel 2) is selected to provide the transmit function. The angle between the platform 400 and the approaching satellite 420A may be different from the angle between the platform 400 and the receding satellite 420R.

In FIG. 4B the DESA system computes which set of ESA antenna receive panels 402 have the best look angle to the approaching satellite 420A. A different set of ESA antenna receive panels 402 may be used to initiate communications with the approaching satellite 420A than the set that was being used with the receding satellite 420R. The DESA system points the receive beams of the ESA antenna receive panels 402 that have the best look angles to the approaching satellite. The DESA system then determines which set of ESA antenna receive panels to use for diversity combining based on which panels have the highest received signal strength level and highest SNR coming from the approaching satellite 420A. In the example shown in FIG. 4B, these are the receive panels in ESA antenna panels 5 and 6. A switch in the DESA system disconnects ESA antenna receive panels 1-4 from the modem's demodulator and connects the output of the combined ESA antenna receive panels 5 and 6 to the modems demodulator.

In FIG. 4C the ESA transmit panel associated with one of the ESA receive panels that are now pointed at the approaching satellite 420A that have the highest receive signal strength and receive SNR is selected as the transmit panel and is connected to the modem's modulator and the transmission over the approaching satellite 420A begins. All communications will now go over the approaching satellite 420C, as shown in FIG. 4C. This will continue until this satellite has moved along in its orbit to become the receding satellite and a new approaching satellite has come into view of the platform. The Break-Before-Make handover process will repeat with this new approaching satellite.

If link conditions change, the modems at each end of the link may adjust the modulation and coding to be different from what was used to communicate with the receding satellite. During the time that it takes to switch the modem, reacquire the receive signal from the approaching satellite and start up its transmitter over the approaching satellite, communications will be interrupted.

FIG. 4D illustrates a flow chart of a process that may be carried in a Break-Before-Make handover with a DESA system, according to an embodiment. The process of FIG. 4D may commences from an initial status wherein a group of Rx antennas and a Tx antenna are communicating with a current satellite. This initial status may be arrived at by, e.g., the process illustrated in FIG. 2B. At 460 it is checked whether communication should be changed over from the current satellite, which is receding, to an approaching satellite. If so, using the ephemeris data, at 461 the controller selects which panels may have a good line of sight to the approaching satellite and directs these panels to the ephemeris coordinates.

At 462 the diverted panels receive the signal from the approaching satellite and the parameters of the signal are measured and in 464 the parameters from each panel are compared against a threshold. For each panel having Rx signal parameter exceeding the threshold, that panel is assigned to the new Rx group at 465. The system then disconnects from the modem's demodulator the panels pointing to the receding satellite at 466, and at 467 connects the panels pointing to the approaching satellite to the modem's demodulator. At 468 the system selects the best panel from the Rx group and assigns that panel for Tx and connects that panel to the modem's modulator at 469.

Use of DESA System for Non-Geostationary Orbit (NGSO) Satellite Constellation Make-Before-Break Handover Make-Before-Break Handover uses two different ESA antenna beams to simultaneously point to the receding and approaching satellites at the same time during the handover interval. Multiple ESA antenna beams can be achieved in several ways. Two separate ESA antenna panels, each with their own receive and transmit functions can be used. A single ESA antenna panel can be split up into a two sets of elements with one set of antenna radiating elements pointed by their beamformers (phase shifters) to point in one direction and the other set of antenna radiating elements pointed by their beamformers in a different direction. For example, in FIG. 1 the phase shifters 110 of the top four elements 105 can be controlled to form one beam and the phase shifters 110 of the bottom four elements 105 can be control to form a separate beam. This system can have different signals transmitted and received by each of the two beams if separate signal feed networks are used for each half of the array elements when the array has been subdivided. The antenna array aperture is effectively reduced by one half and the gain is effectively reduced by one half if the one half of the array elements are used to form each beam. Alternatively, if two beamformers (e.g., in FIG. 1 two phase shifters 110 for each radiator 105) are used with each element and they have different phase shifts, two separate beams can be formed and directed in different directions. This would again require two separate signal feed networks, one for each beam and going to each of beamformer associated with each radiating element.

Because the signals sent over the receding and approaching satellites simultaneously during the handover interval, Make-Before-Break handover requires two antennas at the satellite operator's gateway (or teleport or hub) and two antennas (or the splitting of one antenna) at the user terminal. In this example, two antennas are used at each end of the link, i.e., two at the gateway and two at the user terminal.

FIGS. 5A-5D illustrate the basic steps for Make-Before-Break handover with two ESA antenna panels 502 and 503. In addition to dual antennas at both ends of the link, Make-Before-Break handover requires either two modems or a special modem with two demodulators (receivers) and a single modulator (transmitter) at the gateway 530 and at the user terminal 500. Optionally a method of detecting and eliminating duplicate packets for a packet-oriented communications link is implemented as well. In FIGS. 5A-5D, an example of Make-Before-Break handover using two separate ESA antennas 502 and 503 in the user terminal 500, along with a single modem 530 that has one modulator 537 and two demodulators 535 and 536. In the case where two modems are used, only one of the two modems' transmitters are used. The receive side of each antenna is connected directly to each of the modem demodulators and a switch is used to connect the modulator between the two antennas' transmit sides.

Figure 5A:
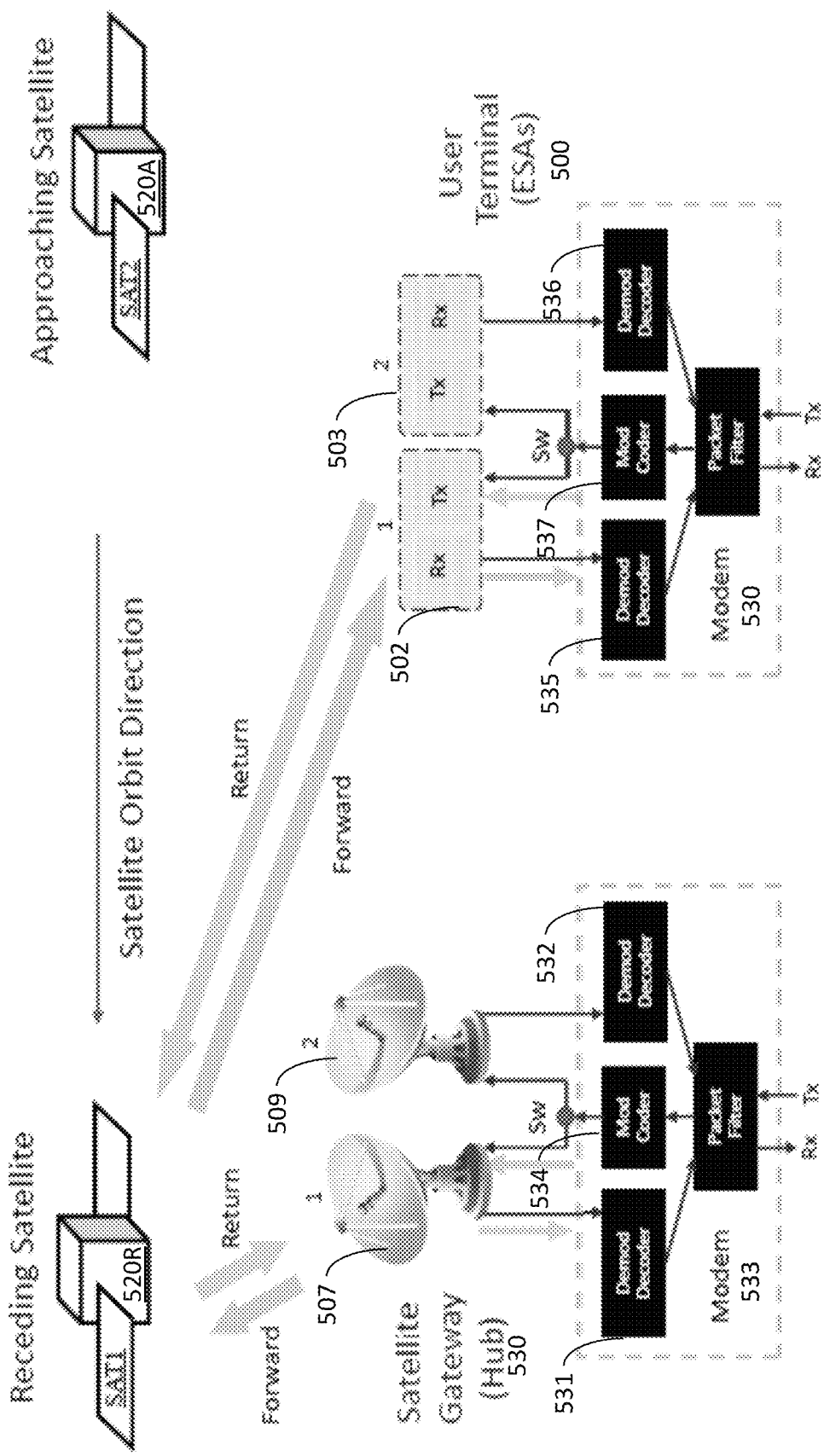
FIGS. 5A-5D illustrate the basic steps for Make-Before-Break handover with two ESA antenna panels, according to an embodiment.

In FIG. 5A, communications proceed over the receding satellite 520R. At the gateway 530 the modem's modulator 534 is connected via a switch (Sw) to the transmit side of the gateway antenna 507 that is pointed at the receding satellite 520R and the demodulator 531 connected to the receive side of the gateway antenna 507 pointed at the receding satellite is active. Similarly, at the user terminal 500, the modem's modulator 537 is connected via a switch (Sw) to the transmit side of the user terminal ESA antenna 502 that is pointed at the receding satellite 520R and the demodulator 535 connected to the receive side of the user terminal ESA antenna pointed at the receding satellite is active. A packet filter (in each modem or externally) is used to add a header to the transmitted packets with a packet sequence number and then to use these sequence numbers to eliminate any duplicate packets on the receive side at each end of the satellite link. These sequence numbers can also be used to detect whether any packets were lost over the satellite transmission path and whether any packets are missing.

Figure 5B:
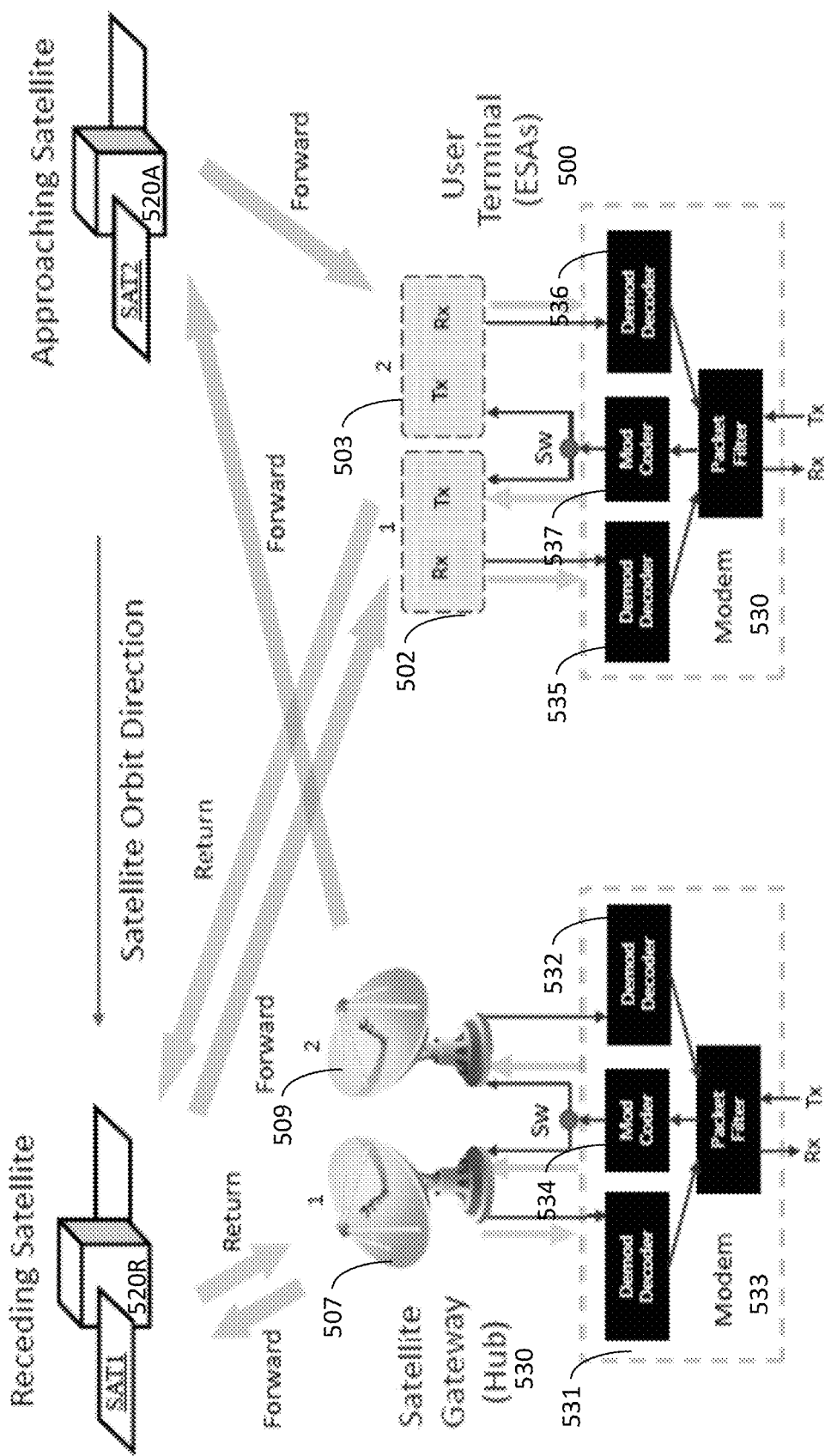

As shown in FIG. 5B, as the next approaching satellite 520A in the constellation comes into view, the second antenna 509 at the gateway 530 and the second antenna 503 at the user terminal 500 are pointed to the approaching satellite. The approaching satellite's ephemeris data and the received signal strength is used to help the gateway and user terminal find, track and lock onto the approaching satellite 520A. A satellite beacon signal can also be used to help the user terminal find and track the approaching satellite. The switch (Sw) in the gateway's transmit path is switched to connect the gateway modem's modulator 534 to transmit over both gateway antennas 507 and 509, over the receding satellite and the approaching satellite, respectively, at the start of the handover interval when both the approaching and receding satellite are in view of the gateway and the user terminal. This signal is received from the approaching satellite on the receive side of the user terminal's second antenna 503 and then passed to the user terminal's modem second demodulator 536.

Figure 5C:
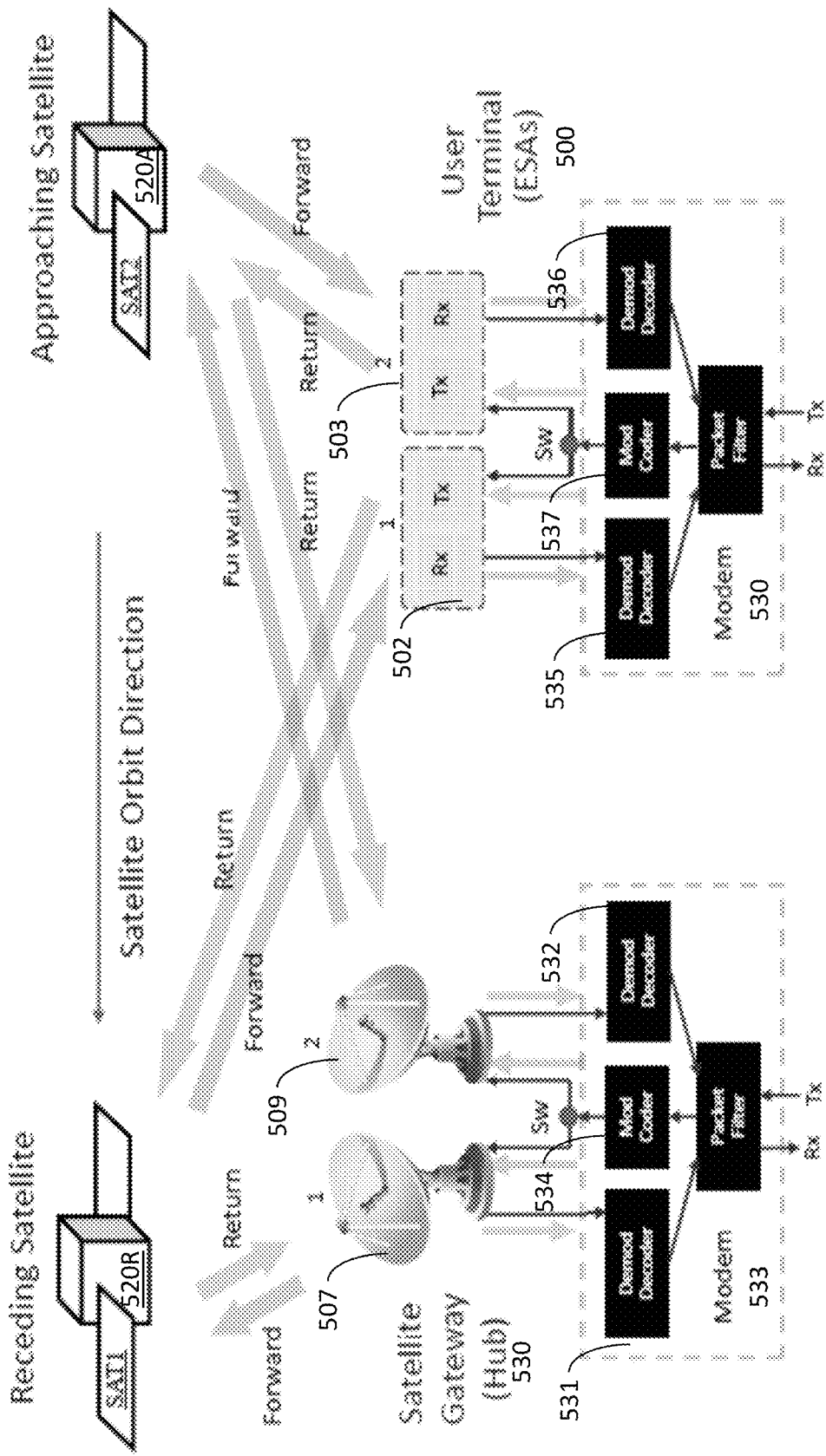

Once the second demodulator 536 in the user terminal's modem 530 has locked onto and acquired the signal coming from the approaching satellite (successfully demodulated and decoded packet data), the switch (Sw) in the user terminal connects the user terminal's modulator 537 to transmit over both antennas 502 and 503, as shown in FIG. 5C. The modulator 537 is now simultaneously connected to the transmit sides of both antennas in the user terminal and is simultaneously transmitting over the receding and the approaching satellite. For a brief interval, defined by the satellite signal round trip times, the gateway and user terminal are communicating over both the receding and approaching satellite. Once the user terminal's return path signal from its second antenna 503 has reached the second antenna at the gateway via the approaching satellite 520A and the second demodulator 532 in the gateway modem has acquired the signal from the approaching satellite (successfully demodulated and decoded the packet data), the handover can be completed.

Figure 5D:
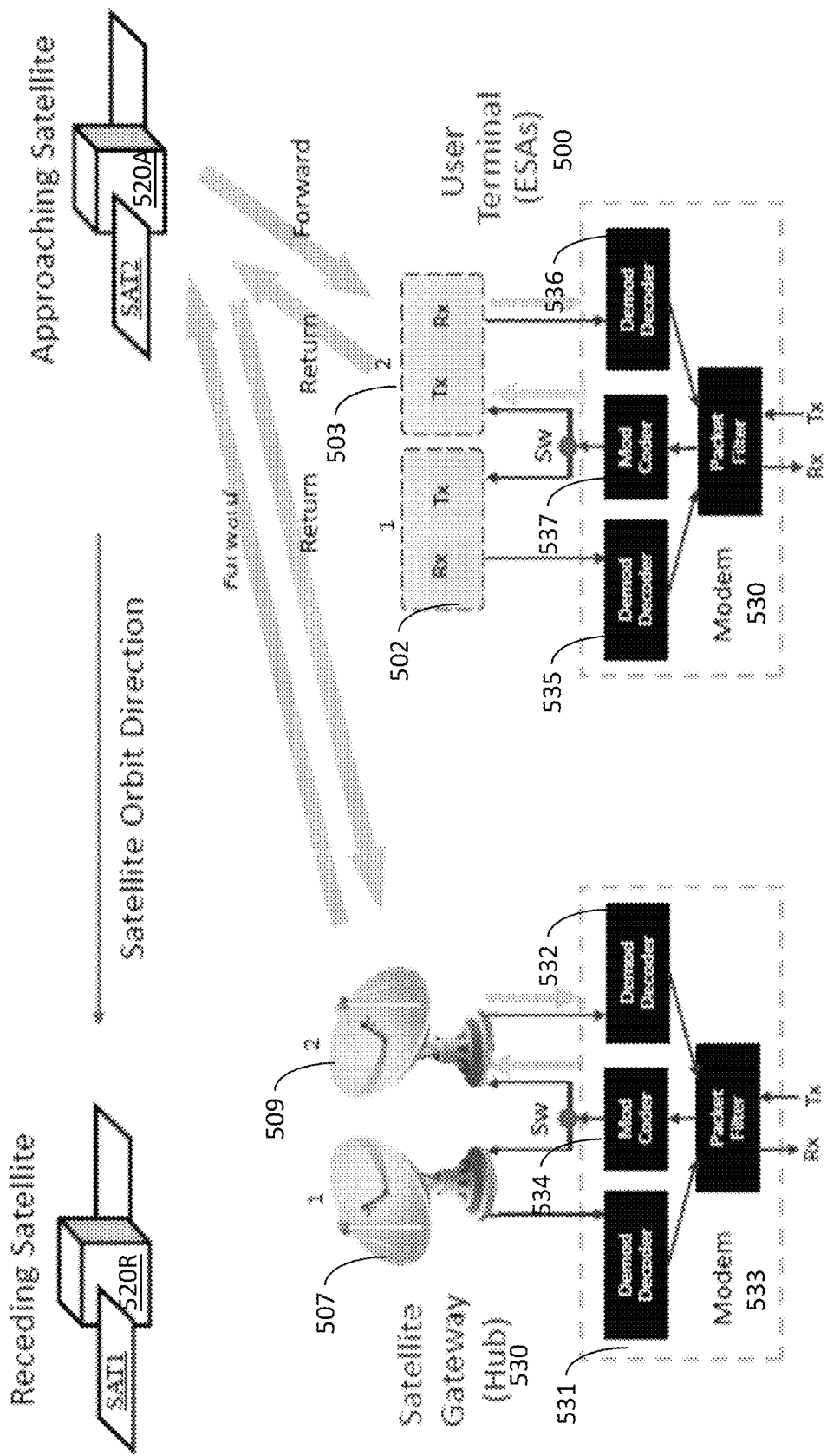

In FIG. 5D, once the demodulator 532 connected to the second antenna 509 at the gateway (the one now communicating over the receding satellite) has achieved modem lock and is receiving good packet data, the transmitter path switch Sw in the gateway removes the modem's modulator signal from the first antenna 507 (and stops transmitting over the receding satellite). The transmitter path switch Sw also removes the modem's modulator 537 signal from the first antenna 502 in the user terminal and handover is complete. The approaching satellite 520A is then used for communications between the gateway and the user terminal.

At some point, the satellite that was the approaching satellite in the last handover becomes the receding satellite in the next handover and the next satellite in the constellation appears in view and becomes the approaching satellite. At this time, antenna 507 at the gateway and antenna 502 at the user terminal are pointed at the next approaching satellite and handover sequence of events repeats. The roles of the antennas in successive handovers switch back and forth. The free antenna is always used for tracking and acquiring the next approaching satellite in the constellation at each handover.

In the DESA case when multiple antenna panels are located on a platform, at any given instant, the ESA antenna receive panels that are oriented toward the receding satellite and contribute positive signal-to-noise ratio can be combined to yield a larger aperture with higher gain via signal processing in the DESA system. The ESA antenna transmit panel that is associated with the ESA antenna receive panel with the highest SNR will be chosen to provide the transmit function. This is shown in FIG. 6A and the selection of ESA antenna receive panels (and the ESA antenna transmit panel) can change over time as the platform and receding satellite move. The DESA combined output from the ESA antenna receive panels is connected to the modem's demodulator via the DESA system in place of the single receive panel shown in FIG. 5A. The modem's modulator will be connected to the ESA antenna transmit panel that has been selected by the DESA system at that instant.

As the satellite constellation enters the handover interval for this platform at a certain location on Earth, the DESA system determines which ESA antenna receive panels will have the best look angle toward the new approaching satellite. It will steer its antenna receive panels toward the location in space where the approaching satellite 620A is located based on satellite ephemeris data that has been provided to it and other information that it has about the approaching satellite's location. Each of the receive antenna panels that are now pointed toward the approaching satellite 620A will go through their tracking algorithm to acquire and lock onto the approaching satellite as shown in FIG. 6B. The DESA system will combine them and connect them to the modem's second demodulator (as shown in FIG. 5B for the single pair of antennas). Once the second demodulator has locked onto the incoming signal and is able to decode packet data, the DESA system will select the ESA antenna transmit panel that is associated with the ESA antenna receive panel with the highest signal gain and highest SNR from the approaching satellite. It will connect this ESA antenna transmit panel to the modem's modulator. The modulator will also still be connected to the ESA antenna transmit panel that is associated with the ESA antenna receive panels communicating over the receding satellite. For a brief time (determined by the satellite operator) during the handover interval, the platform will be communicating over both the receding and approaching satellite as shown in FIG. 6C.

Once the satellite operator's gateway starts to receive good data over the approaching satellite's path, it will cease transmitting over the receding satellite. After a satellite hop time, the platform's ESA antenna receive panels that were communicating over the receding satellite will detect that the signal from the receding satellite has gone away and the ESA antenna transmit panel selected by the DESA system will cease transmitting over the receding satellite. All communications will now go over the approaching satellite as shown in FIG. 6D. This will continue until this satellite has moved along in its orbit to become the receding satellite and a new approaching satellite has come into view of the platform. The Make-Before-Break handover process will repeat with this new approaching satellite.

Figure 6E:
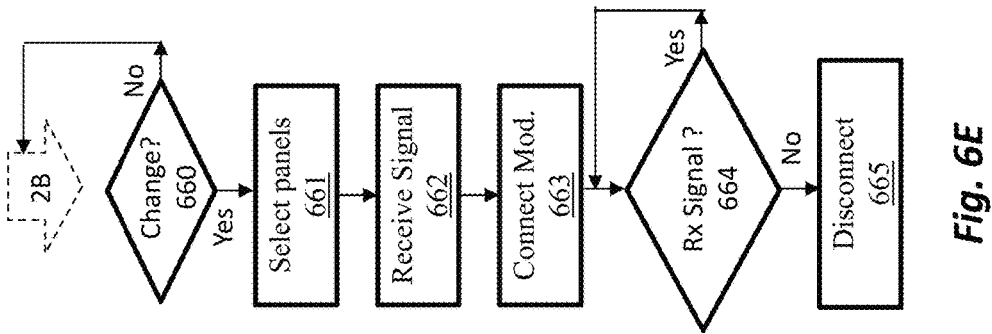
FIG. 6E is a flow chart illustrating a process for Make-Before-Break handover, according to an embodiment.
Figure 6A:
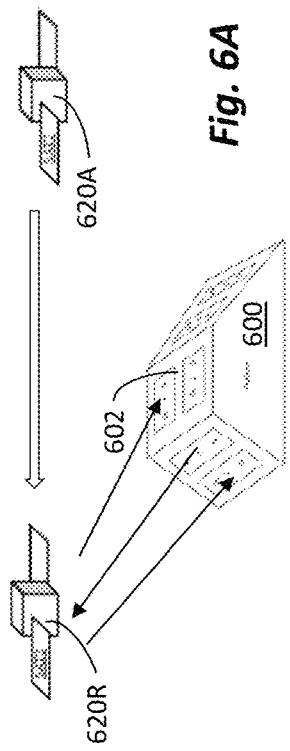
FIGS. 6A-6D illustrate the basic steps for Make-Before-Break handover with DESA antenna panels, according to an embodiment.
Figure 6B:
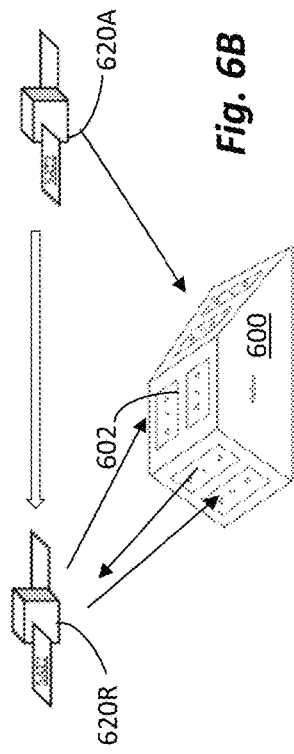
Figure 6C:
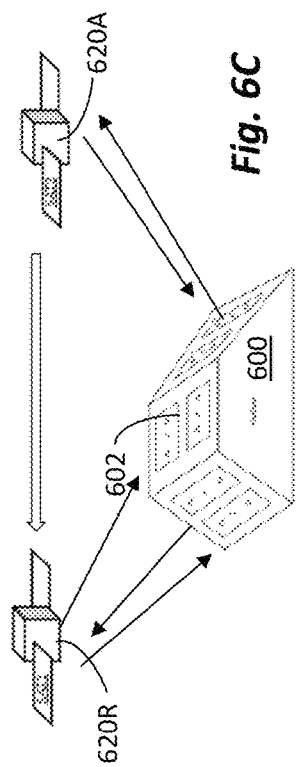
Figure 6D:
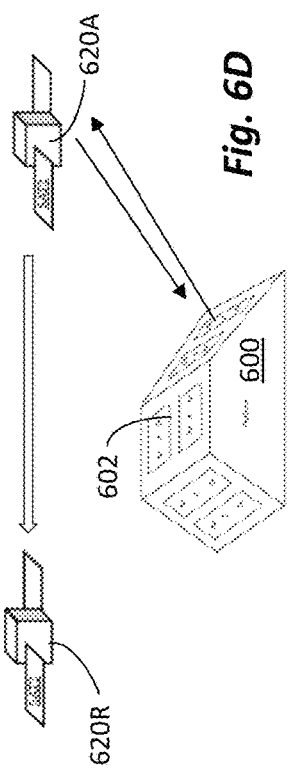

FIG. 6E illustrates a flow chart for a generic process of Make-Before-Break Handover using multiple ESA antenna beams, according to embodiments. Prior to initiating the changeover process the system communicates over a receding satellites using a first sub-set of available communication panels. The first subset may be one antenna of two available antennas or a group of panels from multiple available panels. At 660 when it determined that communications should be changed over to an approaching satellite, a second subset of panels are directed at the direction of the approaching satellite at 661. At 662 the signal received by the second subset is transferred to the demodulator and once the demodulator locks onto the signal from the second subset, at 663 the modulator is connected to the transmission panel selected the second subset and communication proceeds over both the first and second subset simultaneously. At 664 it is checked whether a receive signal Rx is still received by the first subset. When no Rx signal is received by the first subset, the first subset is disconnected from the modem at 665 and communication continues only on the second subset. When the process of FIG. 6E is performed in a DESA system with multiple panels, the process of grouping the panels for the receive subset and of selecting the best panel for transmission can be included, e.g., the process illustrated in FIG. 2B.

Communicating Over Multiple Satellites Simultaneously

Multiple ESA antenna panels on a platform can be split between two or more different satellites at different locations in space. These can be two or more geostationary satellites at different orbital locations or a combination of one or more geostationary satellites and a combination of one or more non-geostationary satellite constellations depending on the number of ESA panels on the platform. FIG. 7 shows four ESA antenna panels on a platform split into two groups 702 and 703 of two ESA antenna panels each. For example, one group 702 is used to communicate over a geostationary satellite 720A and one group 703 is used to communicate over a Low Earth Orbit (LEO-non-geostationary satellite) 720B. The DESA system 700 combines the ESA receive panels in each of these groups and selects the appropriate ESA transmit panel according to the transmit selection methods describe in this disclosure. Since the two satellites will likely connect to different hub modems at different gateway sites associated with these different satellites, the DESA system 700 will combine the antenna panels in each group and connect each group of panels to a separate modem, e.g., modem 530A and modem 530B (one for each satellite). The signal from the modems can be coupled to a local area network 550 of the user.

Based on its knowledge of the platform's orientation and the positions of the different satellites in space, the DESA system divides the ESA antenna panels up into groups and determine which ESA antenna panels are in each group. As shown in FIG. 8A, the ESA antenna receive panels in a group that have the best angles toward satellite 820A will steer their beams toward that satellite and go through the signal acquisition process. These ESA antenna receive panels will be combined to create the larger receive aperture and the combined signal will be connected to the demodulator of the modem for that satellite. The DESA system will determine which ESA antenna receive panels have the best angle toward 820B and these ESA receive antenna panels will steer their beams toward that satellite and go through the signal acquisition process as group. These ESA antenna receive panels will be combined to create the larger receive aperture and the combined signal will be connected to the demodulator of the modem for that satellite. In the example shown in FIG. 8A, ESA antenna panels 1-4 are in group 802 and pointed toward satellite 820A and ESA antenna panels 5 and 6 are in group 803 and pointed toward satellite 820B.

The DESA system will determine which of the ESA receive panels in each group have the highest signal gain with the satellite and the highest SNR and will select the ESA transmit panel associated with that ESA receive panels to perform the transmit function. This ESA transmit panel in each group will be connected to the modem's modulator for the satellite in that group as shown in FIG. 8B. Membership of ESA panels in a particular group will vary over time as the platform and satellites move and the selection of the ESA transmit panel in a group may also vary over time as angles toward particular satellites change.

For non-geostationary satellites that use Make-Before-Break handover, the group pointed at the receding satellite may be subdivided up into two groups if the ESA antenna panels in this group have good angles toward the approaching satellite. If not, other ESA antenna panels in another group that were pointed toward another satellite may be used (taken away from the communication over that satellite) and pointed toward the approaching satellite. This may reduce the number of ESA antenna panels used with that satellite, but the algorithm will attempt to keep a minimum number of panels pointed at each satellite. This may reduce the number of panels able to be used with the approaching satellite in the non-geostationary constellation.

Figure 9A:
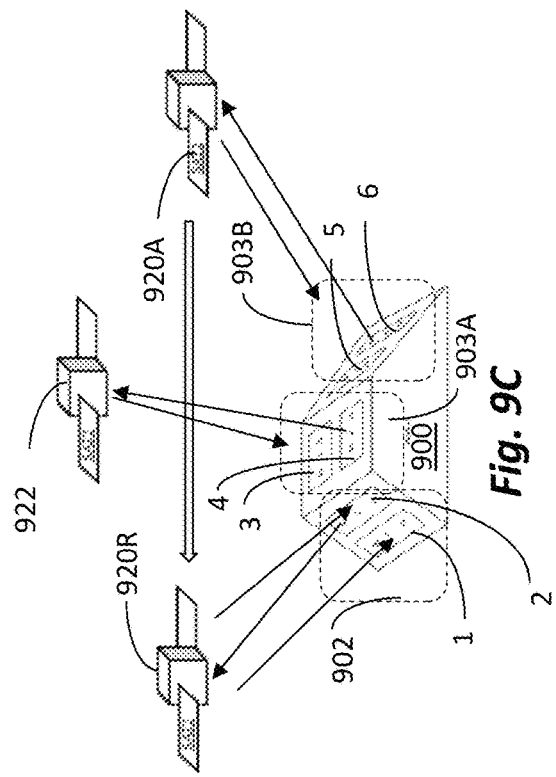
FIGS. 9A-9D illustrate a DESA system communicating over multiple satellites simultaneously, according to an embodiment.

In the example illustrated in FIG. 9A, ESA antenna panels 1 and 2 are grouped into group 902 and are pointed at the receding NGSO satellite 920R, and ESA antenna panels 3-6 are grouped into group 903 and pointed at a GEO satellite 922. In this case the DESA system has selected the transmit function for the NGSO receding satellite 920R served by the ESA antenna panels in group 902 to come from ESA antenna panel 2. This is based on the ESA transmit panel associated with ESA receive panel with the highest signal gain and highest SNR in group 902. The DESA system has selected ESA antenna panel 4 for the transmit function for the GEO satellite served by group 903. Again, this is based on the ESA transmit panel associated with ESA receive panel with the highest signal gain and highest SNR in group 903.

Figure 9C:
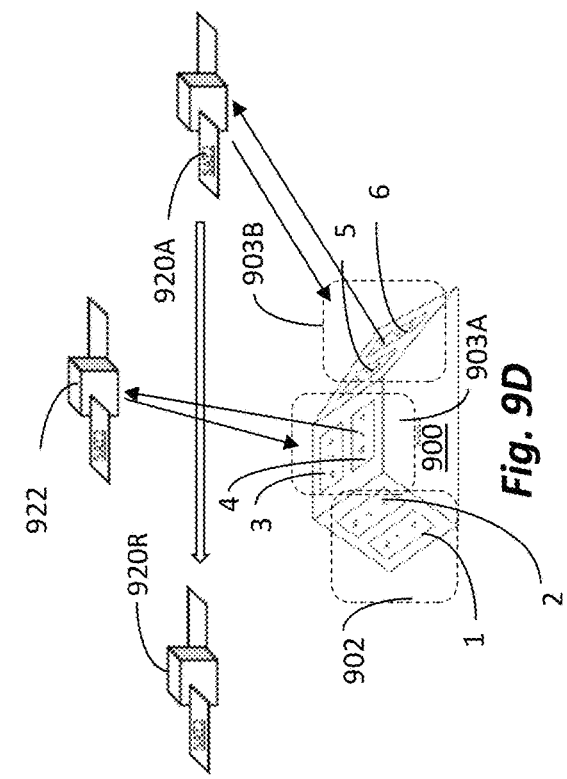
Figure 9B:
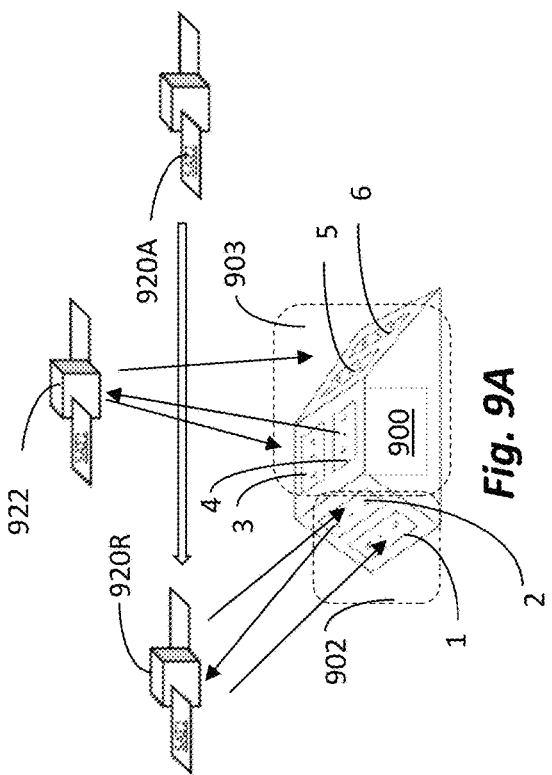

In FIG. 9B, as the NGSO approaching satellite 920A comes into view, the DESA system 900 determines which ESA antenna panels will have the best view of this approaching satellite 902A and, in this example subdivides group 903 into group 903A and group 903B. Group 903A panels will continue to communicate over the GEO satellite 922, but the ESA antenna receive panels now in group 903B will point toward and acquire the signal coming from the NGSO approaching satellite 920A and the DESA system will combine these receive panels and connect them to the second demodulator of the modem for the NGSO satellite constellation, in a manner like what is shown in FIG. 5B for the dual antenna Make-Before-Break handover.

Figure 9D:
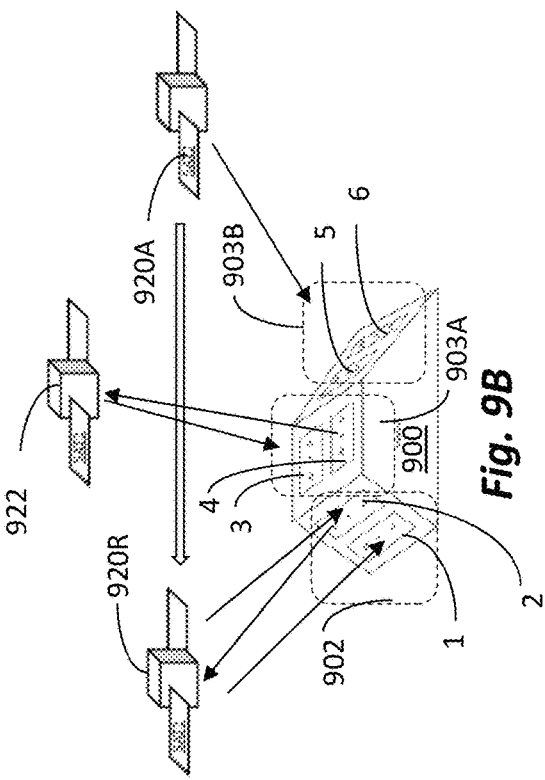

Once the second demodulator has locked onto the received signal and is decoding good packets, the DESA system selects an ESA antenna transmit panel to use with the approaching satellite 920A. For transmission over the approaching satellite 920A, the DESA system selects ESA transmit panel that is associated with the ESA antenna receive panel with the highest signal gain and the highest SNR in group 903B. The NGSO satellite modem modulator is switched to connect over the approaching satellite 920A, while still connected to an ESA antenna transmit panel that is transmitting over the receding satellite 920R, as shown in FIG. 9C. Once communications have been established over both paths between the NGSO satellite gateway and the NGSO satellite user terminal using the approaching satellite 920A and the receding satellite 920R, the gateway turns off transmission over the receding satellite 920R. All communications over the NGSO satellite are now over the approaching satellite 920A, as shown in FIG. 9D. In this example two antenna panels 1 and 2 are now unused. Depending on orientation of the platform to the satellites in space, the DESA system will evaluate which satellites, if any, to assign to these two ESA antenna panels, and will continuously evaluate this over time as the platform and the satellites in space continue to move.

Overcoming Blockage of ESA Antenna Panels on the Platform

The ESA antenna panels may be mounted on a platform in such a manner that at various times the line-of-sight signal path between a particular ESA antenna panel and a satellite in space may be blocked by some structure or a portion of the platform. For example, on a ship, some antenna panels mounted near a smokestack may be blocked by the smokestack depending on the orientation of the ship with respect to the satellite or satellites. On an aircraft fuselage, an antenna panel's line-of-sight signal path to a particular satellite may be blocked by the aircraft tail or by a roll or pitch maneuver of the aircraft. On the body of a helicopter, the line-of-sight signal path to a satellite may be periodically blocked by a helicopter rotor.

The DESA system will have information about the orientation of the platform and the locations in space of the satellites that are being used. In the case of a helicopter, the DESA system may also have information about the helicopter rotor size and thickness and speed of rotation at any instant to predict when rotor blockage may occur. When blockage of an ESA antenna panel in a DESA system occurs, the DESA controller can take one of the following actions. Subtract the blocked ESA antenna panel from the aggregated array and temporarily operate with fewer combined panels and lower gain during the time of blockage; switch to use other panels on the platform that are not blocked during the time of blockage and then continue to use these panels or switch back to the original panels after the blockage goes away.

Figure 10:
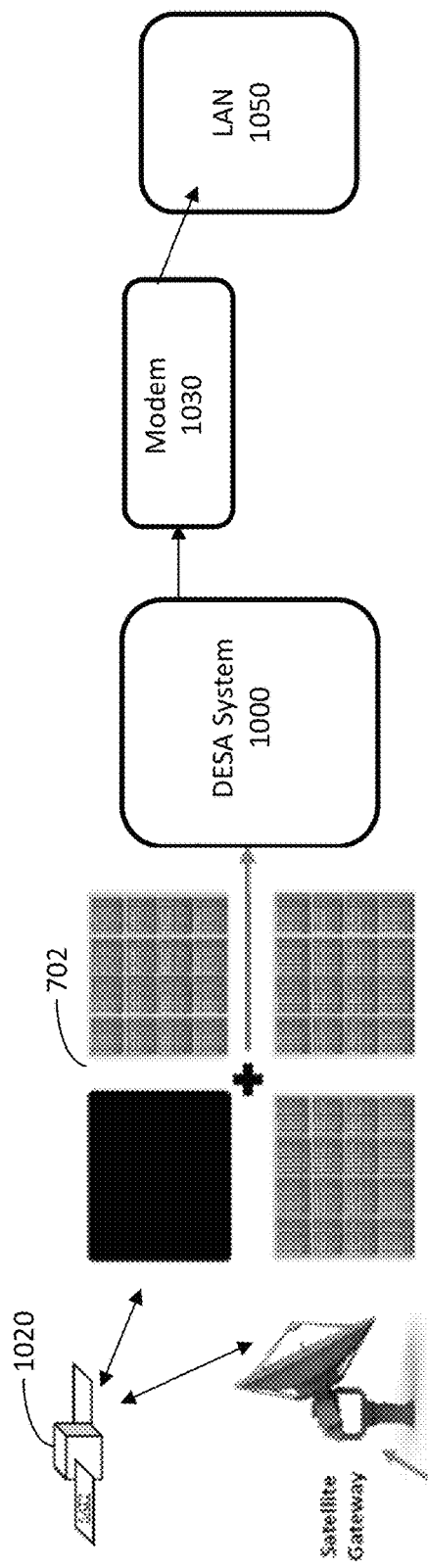
FIG. 10 illustrates an embodiment wherein all the ESA panels are combined, and all used with a single satellite and then one panel is blocked.
Figure 11:
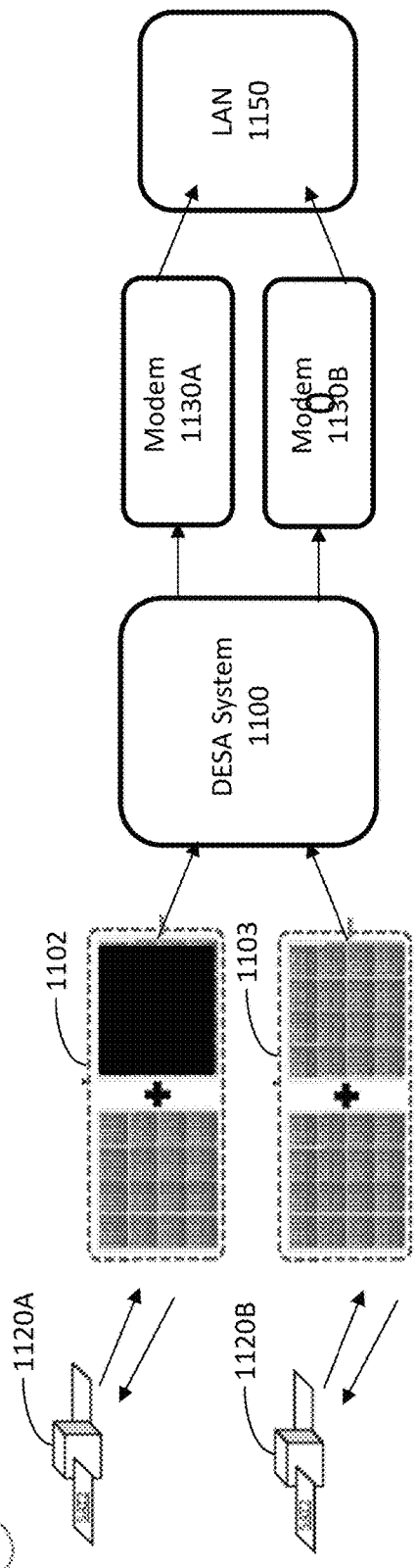
FIG. 11 illustrates an embodiment when the panels have been split between two satellites and then one of the panels for one of the satellites is blocked.

FIG. 10 illustrates the case when all the ESA panels are combined, and all used with a single satellite and then one panel is blocked. FIG. 11 shows the case when the panels have been split between two satellites and then one of the panels for one of the satellites is blocked. Therefore, the use of multiple panels in a DESA system offers resilience to different operating conditions.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A method for controlling communication of a plurality of phased array antennas, each of the phased array antennas having a receive panel and an associated transmit panel, comprising:
    receiving an indication of communication to be established with a current satellite;
    using ephemeris data of the satellite, directing each of the receive panels towards the current satellite;
    for each of the receive panels, determining whether parameters of a receive signal from the current satellite exceeds a preset threshold;
    grouping all receive panels having the parameters of the receive signal exceeding a preset threshold to form a receive group;
    from the receive group determining which receive panel has the highest scored parameter of the receive signal; and,
    selecting the associated transmit panel of the receive panel having the highest scored parameter and directing transmission through the selected associated transmit panel.

2. The method of claim 1, wherein the parameter is selected from the group comprising: signal strength, signal to noise ratio (SNR), and gain to noise temperature ratio (G/T).

3. The method of claim 1, wherein upon receiving an indication to acquire an approaching satellite, further comprising:
    directing selected receive panels to the approaching satellite;
    upon locking on signal received from the selected receive panels muting the associated transmit panel, determining which selected receive panel has the highest scored parameter, and selecting transmit panel associated with the selected receive panel having the highest scored and directing transmission through the selected associate transmit panel.

4. The method of claim 3, wherein the selected panel comprise a subset of the plurality of phased array antennas.

5. The method of claim 3, further comprising upon receiving confirmation of communication with the approaching satellite, abandoning communication with the current satellite.

6. The method of claim 1, further comprising periodically determining for each receive panel whether parameters of a receive signal from the current satellite drops below the preset threshold and dropping such receive panel from the receive group.

7. The method of claim 1, further comprising periodically using the ephemeris data of the current satellite to determine whether additional receive panels should be directed at the current satellite.

8. The method of claim 1, further comprising periodically rechecking which receive panel has the highest scored parameter of the receive signal, and selecting the associated transmit panel of the receive panel having the highest scored parameter and directing transmission through the selected associated transmit panel.

9. The method of claim 1, further comprising periodically rechecking for each receive panel whether the receive signal from the current satellite exceeds a preset threshold; and grouping all of the receive panels having the parameters of the receive signal exceeding a preset threshold to reform the receive group.

10. The method of claim 1, wherein upon receiving an indication to acquire a second satellite, further comprising:
    selecting a subset of the receive panels and directing the subset to the second satellite, while maintaining communication with the current satellite via remaining panels;
    upon receiving signal from the second satellite, for each of the receive panels of the subset, determining whether parameters of a receive signal from the current satellite exceeds a preset threshold;
    grouping all receive panels of the subset having the parameters of the receive signal exceeding a preset threshold to form a second receive group;
    from the second receive group determining which receive panel has the highest scored parameter of the receive signal; and,
    selecting the associated transmit panel of the receive panel from the subset having the highest scored parameter and directing transmission through the selected associated transmit panel, thereby maintaining communication with the current satellite and the second satellite simultaneously.

11. The method of claim 10, wherein upon receiving an indication to acquire a third satellite, further comprising:
    using ephemeris data of the third satellite to select one of the receive group or the second receive group as have better line of sight to the third satellite;
    dividing the one of the receive group or the second receive group having the better line of sight to the third satellite into a first set and a second set;
    redirecting the second set to establish communication with the third satellite.

12. The method of claim 11, further comprising upon confirming communication with the third satellite, terminating communication using the first set.

13. The method of claim 12, further comprising joining the first set to the second set.

14. A method of managing a distributed electronically steerable array having a plurality of receive panels and a plurality of transmit panels, each transmit panels associate with one of the receive panels, comprising:
    directing the plurality of receive panels to receive signal from a satellite;
    for each of the receive panels determining whether parameter of the receive signal exceeds a preset threshold, and grouping all of the receive panels having parameter exceeding the preset threshold into a receive group;
    from the receive group, determining one receive panel having parameter exceeding the preset threshold the most;
    selecting one transmit panel associated with the one receive panel and connecting the one transmit panel to a modulator.

15. The method of claim 14, wherein the parameter is at least one of signal strength, signal to noise ratio (SNR), and gain to noise temperature ratio (G/T).

16. The method of claim 15, further comprising, periodically rechecking the receive group to determine whether a new receive panel has parameter exceeding the preset threshold the most; and selecting a new transmit panel associated with the new receive panel and connecting the new transmit panel to a modulator.

17. The method of claim 16, further comprising periodically using the ephemeris data of the satellite to determine whether other of the receive panels should be joined to the receive group.

18. The method of claim 17, wherein upon receiving an indication to acquire a new satellite, the method further comprises:
- using the ephemeris data of the new satellite to determine a subset of the plurality of receive panels that have line of sight to the new satellite;
- directing the subset towards the new satellite;
- upon receiving new signal from the new satellite, checking whether the parameter of the new signal received at each panel of the subset exceeds the preset threshold;
- grouping all receive panels of the subset having parameter of the new signal exceeding the preset threshold into a new receive group;
- determining selected receive panel having parameter of the new signal exceeding the preset threshold the most;
- selecting as a new transmit panel a transmit panel associated with the selected receive panel.

19. The method of claim 18, further comprising maintaining communication with the satellite using the receive panels not selected into the subset, and maintaining communication with the new satellite with the receive panels of the subset.

20. The method of claim 18, further comprising upon confirmation of communication with the new satellite, terminating communication with receive panels not belonging to the sub set.

* * * * *